3,387,405
CONTINUOUS FILM MULCH FROM POLYVINYL ALCOHOL AND ASPHALT OR WAX
John M. Iwasyk and Bernard C. Lawes, Wilmington, Del., assignors to E. I. du Pont de Nemours and Company, Wilmington, Del., a corporation of Delaware
No Drawing. Filed June 27, 1966, Ser. No. 560,848
37 Claims. (Cl. 47—9)

This invention relates to agricultural mulching, and more particularly to soil-contacting continuous film mulches, their preparation, and intermediates thereto.

It is now well known to apply continuous polyolefin films or sprayed asphalt or wax emulsions as soil-contacting mulches, cf. W. Barksdale, Progressive Farmer, page 84 et seq., February 1964; W. E. Larsen, Use of Mulch in Cotton Production, paper prepared for 1963 Western Cotton Production Conference. However, polyolefin film does not permit crop emergence by film penetration, must be carefully perforated to obtain a good stand, at consequent high labor cost and reduced efficiency, and is vulnerable to wind displacement. In addition such film does not controllably disintegrate on weathering; and hence, must be manually removed at significant cost when it has served its purpose. Sprayed asphalt or wax mulches, on the other hand, do not provide continuous film coverage except on very smooth surfaced areas at high loadings approximating or exceeding the cost of polyolefin film, in which case they are also difficult to remove. Moreover, when penetrable by emergent crops they are also readily penetrable by weeds. Hitherto therefore, there has been no generally attractive means of providing a soil-contacting continuous film mulch of satisfactory character.

According to the present invention, soil-contacting continuous film mulches are produced by applying and substantially simultaneously gelling fluid aqueous foam which has a volume of at least 0.1 cubic foot per pound, and contains at least 0.5 weight percent of dissolved polyvinyl alcohol which is at least 80 percent hydrolyzed and has a reference viscosity of at least 30 centipoises, and at least 50 percent, based on the weight of the polyvinyl alcohol, of emulsified asphalt or wax softening below 220° F., the foam being applied at a rate corresponding to at least 15 pounds of polyvinyl alcohol per acre to be covered.

It has been found essential that the wet foam as applied have a volume of at least 0.1 cubic foot per pound in order to permit application of a continuous wet cover at economically attractive application levels. Preferably, the volume will be in the range of 0.3 to 2 cubic feet per pound.

It has further been found essential that the wet foam contain at least 0.5 weight percent of the polyvinyl alcohol, and be applied at a rate corresponding to at least 15 pounds of the polyvinyl alcohol per acre to be covered in order that continuous cover may be maintained when the wet foam is gelled and dried. Preferably, the wet foam contains 1 to 2 weight percent of the polyvinyl alcohol and is applied at rates corresponding to 50–150 pounds of polyvinyl alcohol per acre to be covered.

It has also been found that unless the polyvinyl alcohol is at least 80 percent hydrolyzed (i.e., has a ratio of hydroxyl groups to vinyl units of at least 0.8) and has a reference viscosity (i.e., the viscosity of a 4 weight percent solution in water at 20° C. as determined by the Hoeppler falling ball method) of at least 30 centipoises, the strength of the gelled dried mulch at economically feasible application levels is inadequate. Preferably, the polyvinyl alcohol is at least 97 percent hydrolyzed and has a reference viscosity of at least 60 centipoises.

It has additionally been found that unless the polvinyl alcohol is emulsified with at least 50 percent of its weight of asphalt or wax, the resulting product is too brittle and insubstantial to provide a sufficiently durable continuous cover at economically attractive application levels. Operably, the weight ratio of emulsified asphalt or wax to the polyvinyl alcohol may range from 0.5 to 67 or more, but is preferably in the range of 1 to 20. In general, any asphalt or wax which is sufficiently soft to plasticize the polyvinyl alcohol and is of the sufficiently small particle size for emulsification in water may be used. Medium or slow seting asphalts or waxes which soften or are plasticized to soften at 110° F. to 220° F. are preferred. Descriptions of operable waxes and asphalt compositions may be found, for example, in U.S. Patents 2,927,402, 3,061,974, and 3,094,809.

It is within the scope of the invention to apply the wet foam to the soil as a fairly heavy layer one-half inch or more thick. However, for maximum economy, it is desirable to apply relatively thin coatings, preferably on the order of 0.04 to 0.25 inch in thickness, thus minimizing the total volume of foam and, correspondingly, the total volume of liquid required to be handled. At the low levels of binder additive permissibly involved, however, all of these foams are unstable unless further treated, collapsing to substantially unfoamed films and therealong fragmenting within seconds or at most a few minutes after application, depending on the initial thickness. It is therefore essential to achieving continuous cover that the polyvinyl alcohol be gelled substantially simultaneously with its application. Preferably, in order to achieve soil mulching efficiency, the foam will be stabilized by gelation as rapidly as possible after application.

On the other hand, it is also essential for effective economical application that the wet foam remain fluid for a sufficient length of time after it is generated to permit its application as a fluid conforming to the soil surface, preferably as a thin layer or as a spray coalescible to a thin layer before gelation is complete. Hence, preferably, the means for effecting gelation will be such as not to affect fluidity until after the foam has been generated and issued from the generator and coalesced on the soil, but extremely rapid thereafter so as to effect stabilization as promptly as possible after the fluid has contacted and conformed with the soil surface to provide a continuous layer of the desired thickness thereon.

Gelation is accomplished by the use of gelling agents for the polyvinyl alcohol, of which a large number are known in the art. In general, the rate of the gelation reaction depends upon the kind and amount of gelling agent employed, upon the temperature and the pH of the foam, and upon the thoroughness with which the agent is distributed in the foam. By proper control of these variables in conjunction with the time of bringing the gelling agent into contact with the foam, or the liquid from which the foam is generated, it is possible to employ almost any of the known gelling agents in such a way as to bring about gelation in the required time without unduly interfering with the proper generation and application of the foam, and also to help control the weathering life of the mulch.

Preferably, however, a gelling agent precursor, which is stable and ineffective to cause gelation in aqueous acidic polyvinyl alcohol but is converted to a gelling agent which is rapid acting in small amounts when the system is made basic, is included in the foam. The particularly preferred class of such gelling agent precursors includes titanium oxalate complexes which are dissoluble in water to provide tetravalent titanium and at least one mole of oxalate per gram atom of titanium, such as potassium titanium oxalate having the empirical formula $K_2Ti(OH)_2 \cdot C_2O_4 \cdot H_2O$, and the water-soluble fluotitanates, such as sodium fluotitanate having the empirical formula $Na_2TiF_6$. This class of gelling agent precursors is effective at loadings as low as one part of titanium per thousand weight parts of polyvinyl alcohol, and is preferably employed in amounts providing 5 to 125 weight parts of titanium per 1000 weight parts of polyvinyl alcohol. To insure continuous fluidity, the liquid compositions containing such precursors are maintained at pH below 6 and preferably at pH 2–5 with an acid having a dissociation constant in water of at least $10^{-7}$ and preferably at least $10^{-6}$, until it is desired to initiate the gelation reaction. Gelation is then accomplished by contacting the acidic precursor-containing foam with a neutralizing amount of base.

With this preferred class of precursors, further control of the rate of the gelation reaction is afforded by choice of the kind and amount of base employed. An especially preferred method of activating the precursor is to contact the foam with anhydrous ammonia vapor as it issues from the foam generation equipment. The ammonia is used in amount sufficient to increase the pH of the foam above 6, and preferably to 8 to 10.5, so as to bring about stabilization within a second or so after contact. The amount of ammonia and the distance between the foam applicator and the soil are adjusted as necessary to insure that the foam is adequately fluid as it contacts and coalesces to a continuous layer on the soil and is stabilized by gelation almost immediately thereafter. These and other procedures for effecting such gelation are described in the copending application of Bernard C. Lawes, USSN 509,620, filed May 24, 1964, and Alden J. Deyrup, USSN 357,274, filed Apr. 3, 1964, now U.S. Patent 3,318,856, issued May 9, 1967.

Examples of other gelling agent precursors which may be employed in the same manner include a number of other water-soluble tetravalent titanium compounds, such as those of U.S. Patents 2,489,651, 2,870,181 and 3,017,282, as well as compounds of trivalent iron, trivalent chromium, divalent copper and boric acid. However, these compounds lack one or more of the special attributes of the preferred titanium oxalates and fluotitanates; and hence, although operable, are less convenient to use.

Other operable classes of gelling agent precursors are water-soluble compounds convertible to gelling agents by oxidation or reduction. These include trivalent titanium, hexavalent chromium and pentavalent vanadium as disclosed in Harold K. Sinclair, USSN's 370,719–21, filed May 27, 1964, now U.S. Patents 3,258,442, issued June 28, 1966, 3,264,245, issued Aug. 2, 1966, and 3,265,657, issued Aug. 9, 1966. Use of these systems however, introduces additional complications in achieving activation at just the proper time to effect stabilization without premature loss of fluidity. Thermally reversible gelling agents such as Congo Red and Direct Orange may also be used at some loss of convenience, and may be regarded as gelling agent precursors when employed in heated foams which gel on cooling. It is also feasible to employ solutions or foams containing gelling agents or gelling agent precursors or activators and to blend or contact these with the gelable foams as they are generated or issued from the generator. Nevertheless, it will be appreciated that all of the foregoing alternative gelation procedures involve complications which limit their preferred utility to special situations, or to use together with other systems. Organic compounds which react by condensation or acetalization with the polyvinyl alcohol are generally too slow for convenient use alone in the process of the invention, but may be included as extenders for other systems in certain instances or may be used as post-applied sprays to further increase weatherability or toughness. Examples of agents of this class include glyoxal, dimethylol urea and trimethylol melamine.

Foams suitable for application in accordance with the present invention may be prepared by any of several methods known in the art, including injection of fine bubbles of gas into a liquid mixture, dissolution into a liquid of compositions which decompose or volatilize to gasses on pressure release or other activation, or by disintegration of gas bubbles within a liquid mixture. Of these, the last-named has been found greatly preferable in that it can be reliably and effectively accomplished using inexpensive equipment. Essentially with this preferred method, however, the liquid mixture from which the foam is generated includes a water-soluble, water-foaming agent in order to permit generation of sufficiently low-density foam at the economically attractive low binder concentrations.

While any of the well-known water-soluble, water-foaming agents may be used, the anionic alkyl sulfates, the anionic alkyl aryl sulfonates, and the non-ionic polyoxyalkylated phenols, fatty alcohols and fatty acids, each having at least 8 carbons per molecule, are preferred, in amounts ranging from 1 to 300 weight parts per 100 weight parts of polyvinyl alcohol, depending on the ratio of asphalt or wax to polyvinyl alcohol, the higher amounts being desirable at higher ratios. An incidental consequence of using such water-foaming agents is that the resulting foams show increased instability; and hence, must be generated only momentarily before application and very promptly stabilized by gelation to avoid collapse and fragmentation. Thus, where coalescent spray application is desired, the foam preferably does not include water-foaming agent, and is generated by alternate means. The foams can be readily applied around trees, over weed growth, or onto stubble, which provides additional reinforcement.

Dry mulch of useful durability providing integral cover lasting 3 to 21 days, depending on thickness, is obtained by the drying of the wet foams described above after they are gelled. The dry mulch ordinarily appears as a homogeneous structure, and comprises a tough skin, which is underlaid by a cellular mass when the dry continuous cover retains a cellular structure.

It has also been found that mulches of substantially greater durability, providing integral cover for longer periods up to 3 months or more on single application (and indefinite life with repeated application) can be readily provided by incorporating up to 10 weight parts of filler in the foam per weight part of the polyvinyl alcohol. The permeability of the mulch to emergent growth can be controlled by regulating the applied thickness, the proportion of asphalt or wax, the amount and kind of gelling agent, and the kind and amount of filler, and by post treatment so as to favor penetrability by desired emergent growth, while minimizing penetrability by undesired emergent growth.

Fibrous potassium titanate, such as described in U.S. Patents 2,883,620 and 2,841,470, used at loading ratios of 0.1 to 10 and preferably 0.5 to 2 weight parts per weight part of the polyvinyl alcohol has been found outstandingly effective for increasing durability. Mulches containing such reinforcement are initially dark-colored but tend to whiten on aging. This characteristic makes such mulches attractive when the mulch is applied in cold weather, and initially provides a soil heating effect, and thereafter whitens as the weather warms, so as to provide a soil-insulating-moisture-preserving effect. The carbon containing mulches also may be advantageously used to prevent development of light germinated weed growth.

Dispersed carbon at similar loading ratios is also valuable as a filler where it is desired to increase the soil-heating benefit of the mulch, and where it is desired to minimize germination of light-germinated weeds. Where the carbon is supplied as a stable dispersion of discrete particles of maximum dimension, less than 200 millimicrons, and having an ultimate particle size of 8 to 65 millimicrons, it is also effective to strengthen the mulch and provide increased weatherability. Methods of preparing such dispersions are disclosed in U.S. Patent 2,875,171.

Other extending fillers such as clay, titanium dioxide, zeolites and the like may also be included so as to extend or control color, as may also other microfibrous or particulate materials which serve to toughen the asphalt or wax-containing compositions, as well as fertilizers, fungicides, herbicides, and the like. Seeds may also be included in non-phytotoxic compositions, which preferably contain wax rather than asphalt. Total solid additive filler (exclusive of wax or asphalt), however, will preferably not exceed about 10 weight parts per weight part of the polyvinyl alcohol. Depending on their characteristics, such additives may be either dissolved or dispersed in the foam for application. Of course, the foam may also be used to cover an application of seed, fertilizer, fungicide or the like where multiple application is more convenient. An acidic post spray, preferably an aqueous solution of non-phytotoxic acid such as citric or tartaric, can be applied to expedite break-up of the continuous mulch. Hence, the mulch may be used to avert frost damage, and readily disintegrated when the frost danger has passed.

In the preferred practice of the invention, a dry blend of the polyvinyl alcohol, water-foaming agent, filler, gelling agent precursor and acid is prepared for mixing with water at or near the site to be mulched. It has been found that a particularly effective non-caking dry blend can be obtained by admixing the following weight parts of ingredients:

(a) 100 parts of solid polyvinyl alcohol.
(b) 25–150 parts of solid water-soluble anionic water-foaming agent, preferably sodium lauryl sulfate.
(c) 50–250 parts of either or each of fibrous potassium titanate and finely divided carbon.
(d) 5–50 parts of stably water-soluble tetravalent titanium compound, preferably potassium titanium oxalate.
(e) Solid water-soluble acid such as benzoic, sulfamic, oxalic, paratoluene sulfonic or the like in amounts sufficient to produce a pH below 6 when the blend is admixed with 15,000 weight parts water, and preferably 2–5.

Besides being conveniently transportable, it has been found tht the dry blend is more readily distributed into water than are the individual components separately.

Where convenience dictates combining the dry blend with water at a point moderately remote from the intended mulching site, a concentrated aqueous mixture containing 4–15 weight percent of the polyvinyl alcohol is preferably first prepared by admixing such dry blends with water and passing steam into the mixture to a temperature of 90–100° C. Alternatively, acidified water is used together with a dry blend from which the acid is omitted, or the several ingredients may be added separately, taking care to maintain the liquid acidic in the presence of the gelling agent precursor. The concentrated liquid product, which is stable for extended periods, is then further diluted, e.g., to 1–4 weight percent of the polyvinyl alcohol, for further mixing at the site with an asphalt or wax emulsion.

The preferred dilute acidic liquid formulations described above, containing anionic water-soluble, water-foaming agent, may be conveniently mixed with asphalt or wax emulsions to obtain foamable liquid mixtures provided suitable steps are taken to maintain the pH of the mixture in the range of 2–5, and provided further that where the asphalt or wax emulsion is cationically emulsified, a sufficient quantity of non-ionic emulsifier, preferably 0.1–2 weight parts per weight part of asphalt or wax solids, is also added to avoid breaking the emulsion when the two liquids are mixed. Isooctylphenoxypoly(ethoxy)ethanol (Triton X–100) has been found preferable for this purpose.

The invention is more particularly described and explained by means of the following examples, in which, except as otherwise stated, all parts are by weight. The references to softening point are to values obtained by the ring and ball method of ASTM D30–26; the references to penetration are to values via ASTM D5–47T.

EXAMPLE 1

A mixture of 1.5 parts granular polyvinyl alcohol which was 98 percent hydrolyzed and had a reference viscosity of 125 poises ("Elvanol" 73–125), 2.0 parts fibrous potassium titanate, having an average fiber diameter of 0.2–0.3 micron and an average fiber length of 3–5 microns and a weight ratio of $K_2O$ to $TiO_2$ in the range of 6–7, 0.75 part sodium lauryl sulfate ("Duponol" ME), 0.20 part potassium titanium oxalate, and 0.23 part sulfamic acid was prepared by shaking the ingredients together in a polyethylene bag. The mixture remained free-flowing and did not cake on standing for several months.

EXAMPLE 2

The dry blend of Example 1 was added to 25.33 parts of water and the mixture stirred while sparging with steam during about 15 minutes until the temperature reached 90–95° C., and thereafter further stirred and sparged at 90–95° C. for 30 minutes to insure solution of the polyvinyl alcohol. A sample of this mixture, which had a pH in the range of 2–5, remained fluid and ungelled on storage for three months.

EXAMPLE 3

A non-caking dry blend was prepared by the procedure of Example 1 from 3 parts of the polyvinyl alcohol, 2 parts of the fibrous potassium titanate, 3.5 parts carbon black, 0.1 part of sodium lignin sulfonate, 1.5 parts of the sodium lauryl sulfate and 0.4 part potassium titanium oxalate. This was heated by the procedure of Example 2 with 41.5 parts of water containing 0.1 part sulfuric acid to provide a stable dispersion having a pH of about 4, and further diluted with 50 parts of water and the pH adjusted with sulfuric acid to obtain a stable dispersion having a pH of 4.0.

EXAMPLE 4

Thirty parts of a liquid mixture prepared in accordance with the procedure of Example 2 was diluted with 40 parts of water, adding small amounts of sulfuric acid as necessary to reach a final pH of 3.5. A sample of the diluted mixture also remained stable against gelation for three months.

EXAMPLE 5

To seventy parts of diluted mixture prepared in accordance with the procedure of Example 4 was added, with stirring, 30 parts of a medium-setting cationic emulsion containing 20 parts of asphalt (American Bitumuls and Asphalt Co. 1055B), having a softening point of 110° F., and a penetration of 100–200, and to which had been added 0.3 part of isooctylphenoxy poly(ethoxy)ethanol ("Triton" X–100), thereby obtaining a foamable liquid mixture containing the asphalt uniformly emulsified in the polyvinyl alcohol solution, and having a pH of 5, which remained stable against settling and gelling for a period of several weeks and was readily reemulsified by stirring. Similar results were also obtained by adding the diluted mixture of Example 3 to the cationic emulsion containing the "Triton" X–100. In comparison, repetition of the procedure without the non-ionic emulsifier resulted in a temporarily compatible but unstable product, and attempted repetition with a similar but rapid setting cationic emulsion (American Bitumuls and Asphalt Co. 1053B) resulted in the emulsion breaking.

EXAMPLE 6

The procedures of Example 5 were repeated except that an anionic, slow setting emulsion of asphalt, softening at 110–220° F., was used (K. E. McCommaughay Co. SS-1H) without added non-ionic emulsifier, to obtain a stable dispersion.

EXAMPLE 7

The procedures of Example 6 were repeated using, instead of anionic asphalt emulsion, anionic wax emulsion (Hercules Powder Co. "Paracol" 404-R, 50 percent solids, softening at 155° F.) to obtain stable dispersion.

EXAMPLE 8

A foamable liquid mixture prepared according to the procedure of Example 6 was pumped at the rate of 1.1 pounds per minute into a ½" stainless steel pipe T and therein mixed with bubbles of air under a pressure of 140–200 p.s.i.g. The bubbles were disintegrated within the liquid by passing the mixture through a 30-inch long 2-inch diameter stainless steel pipe, packed with 3–6 mm. glass beads to produce a fine bubbled foam having a volume of about 0.3 cubic foot per pound.

EXAMPLE 9

Foam generated by the procedure of Example 8 was led through a length of ¾-inch diameter rubber hose ending in a T where it was mixed with gaseous ammonia through a needle discharging 2 inches inside the exit, at a rate of 0.5 liter (at S.T.P.) per cubic foot of foam, thus raising the pH to ca. 8.0, and deposited on soil in layers about ¾" thick which adhered to the soil and gelled within a second or so after application. The foam dried to a weatherable continuous cellular film, having 20–50 percent of its wet volume, over a one week period.

EXAMPLE 10

The procedure of Example 9 was repeated except that the foam was led from the rubber hose into a plastic spreader terminating in a 7" x $\frac{1}{16}$" slit and having a cavity continuously increasing in cross section down to the exit, in the direction of foam travel, to issue as a ca. $\frac{1}{16}$-inch sheet which was simultaneously deposited on soil and fogged from above with ammonia gas, raising the pH to about 10, to effect gelation within a second or so. The covering dried to an essentially non-cellular continuous film during ½ hour to 3 days.

EXAMPLE 11

Dry blends were prepared by the general procedure of Example 1, combined with water and asphalt emulsion by the general procedure of Examples 2 or 3 and 5 or 6, to contain the below-indicated parts by weight per 100 weight parts of liquid foamable mixture, which was then foamed, applied and gelled by the general procedure of Example 10, except as indicated, and subjected to weathering with results as summarized in Table I. In the table, the amounts of dry mulch applied are given in terms of gallons of liquid mixture foamed and applied, and pounds of dry mulch applied per half acre fully covered (or per acre covered in alternating covered and uncovered strips of equal width, which has the same numerical value). The asphalt identified as (a) was the cationic emulsion of Example 5; the asphalt identified as (i) was the anionic emulsion of Example 6. The asphalt used in comparative Example (J) was a commercially available cationic rapid-setting emulsion of 51 percent solids sold for mulching. All formulations were foamed to a volume of 0.1 to 0.5 cubic foot per pound, and provided continuous cover on drying except as indicated. Relative costs are based on actual and estimated market prices of ingredients used.

TABLE I

Formulation (A)

2 parts asphalt (a)
2 parts polyvinyl alcohol (b)
1 parts fibrous potassium titanate (c)
0.5 part sodium lauryl sulfate (d)
0.1 part octylphenoxypoly(ethoxy)ethanol (e)
0.2 part potassium titanium oxalate (f)
Gallons: 258
Pounds: 125
Relative cost: 50
Minor weathering in 50 days Formulation (B)

Same as A except
4 parts (a)
0.5 part (c)
Gallons: 232
Pounds: 140
Relative cost: 45
Intact after 36 days, 15% lateral shrinkage Formulation (C)

7.5 parts (a)
1.5 parts (b)
1 part (c)
0.75 part (d)
0.17 part (e)
0.2 part (f)
1.75 parts carbon black (g)
Gallons: 210
Pounds: 220
Relative cost: 45
Ten percent gone after 37 days Formulation (D)

20 parts (a)
2 parts (b)
2.7 parts (c)
1 part (d)
0.46 part (e)
0.26 part (f)
Gallons: 256
Pounds: 562
Relative cost: 75
Intact after 50 days.

Formulation (E)

Same as D except added
1.75 parts emulsified ethylene/vinyl acetate wax
Gallons: 310
Pounds: 703
Relative cost: 100
Mostly intact after 50 days Formulation (F)

26.4 parts asphalt (i)
1.5 parts (b)
1.5 parts (c)
1 part (d)
0.2 part (f)
Gallons: 59
Pounds: 150
Relative cost: 26
Twenty percent gone in 23 days Formulation (G)

Same as F except no fibrous potassium titanate
Gallons: 62
Pounds: 146
Relative cost: 25
Completely fragmented in 12 days Formulation (H)

33.5 parts (a)
0.5 part (b)
0.75 part (d)
0.5 part (e)
0.2 part (f)
Gallons: 329
Pounds: 933
Relative cost: 53
Fifteen percent gone in 35 days In comparison for a Formulation (I) the same as H but not gelled after application:

Gallons: 329
Pounds: 933
Relative cost: 52
Sixty percent gone in 35 days

In further comparison, an unfoamed sprayed on cationic asphalt (J) which did not provide continuous cover:

Gallons: 302
Pounds: 1242
Relative cost: 90
Fifteen percent gone in 28 days.

EXAMPLE 12

A mixture (A) was prepared to contain, per 100 parts, by weight, 2.1 parts of polyvinyl alcohol over 98 percent hydrolyzed and having a reference viscosity of 150 centipoises, in solution; 16 parts (solids basis) emulsified wax of Example 7; 5 parts dispersed carbon black having a discrete particle size of less than 200 millimicrons and an ultimate particle size of 8–65 millimicrons, as a 20 percent aqueous dispersion containing a non-foaming anionic dispersing agent, prepared by the general procedure disclosed in U.S. Patent 2,875,171; and 1 part dispersed fibrous potassium titanate of Example 11.

A solution (B) was prepared to contain, per 100 parts, by weight, 0.15 part potassium oxalate, 0.16 part oxalic acid, 0.45 part potassium titanium oxalate of Example 11, and 0.06 part boric acid.

Mixture (A) and solution (B) were pumped to a centrifugal foam generator, at A:B weight ratios of 1.8:1 to 3:1, the generator comprising a spinning perforated bucket. The A/B mixture was fed into one end of the spinning bucket and compressed air simultaneously fed through the bucket perforations to generate foam of 0.3 to 0.5 cubic foot volume per pound. The exiting foam was led through a wide nozzle and spread onto preseeded fertilized strips of ground in a layer 12 inches wide and about ½-inch thick, where it spontaneously gelled within a few minutes after application to provide a soil-contacting continuous wet cover, of about the same thickness, which then collapsed to a thickness of about 0.1 inch within an hour, and dried to a continuous uniform black cellular cover, having a tough skin and about the same thickness, within 24 hours.

Squash, cucumbers, tomatoes, potatoes, beans, cotton, peppers, corn, cabbage, watermelon, cantaloupe rye grass, Bermuda grass and Bahia grass were successfully germinated, emerged, and grown through this mulch, which was applied in Florida during the late winter months and remained essentially intact for about 3 months despite heavy rains and winds of up to 35 miles per hour. Yield increases were obtained over identical unmulched plots. With potatoes, a yield increase of 41 percent was obtained, as compared to a seven percent increase on identical plots mulched with commercial 1½ mil black polyethylene film. With tomatoes, a net increase of seven percent was obtained, compared to five percent with the black polyethylene film on the same basis.

Balancing the selling price of the crops against the material cost of the mulch indicated a net benefit of about $150 per acre with potatoes and about $50 per acre for tomatoes, using the foam mulch, as against a small loss for potatoes and a net benefit of about half as much for tomatoes, using the polyethylene.

In the foam mulched plots weed growth was about one third that of the unmulched plots; moisture concentration in the soil was about five percent higher; high fertilizer concentration remained in the soil after the rains, versus very little fertilizer in the unmulched plots. Similar experiments showed that herbicides such as "Parquat," "DiQuat," "Hyvar" X and "Ammate" were compatible with the foamable mixture allowing gelling to occur, and exhibited herbicidal activity in the foam film.

Further experiments in which the wet foam was applied as a 2-inch thick layer around citrus seedings effectively prevented weed growth for six months. Further experiments indicated that additional desensitizing and/or toughening of the dried film could be achieved by post spraying with aqueous solutions of gelling agents. Marked decreases in water-sensitivity were achieved with sprays applying 0.25 gram of potassium titanium oxalate per square foot, and with 1.2 grams of dimethylol urea per square foot. Larger such decreases, plus increased film toughness, were achieved with 1.2 grams of either glyoxal or trimethylol melamine per square foot. Less weatherable cover resulted from use of polyvinyl alcohol of lower reference viscosity. Substituting ordinary large particle carbon for the finely divided carbon decreased weatherability by about 50 percent.

We claim:

1. A process for mulching soil which comprises applying thereto and substantially simultaneously gelling thereon as a continuous layer a fluid aqueous foam which has a volume of at least 0.1 cubic foot per pound and contains at least 0.5 weight percent of dissolved polyvinyl alcohol which is at least 80 percent hydrolyzed and has a reference viscosity of at least 30 centipoises, and, based on the weight of said polyvinyl alcohol, at least 50 percent of emulsified asphalt or wax softening below 220° F., said foam being applied at a rate corresopnding to at least 15 pounds of polyvinyl alcohol per acre of soil to be covered.

2. Process according to claim 1 wherein said foam has a volume of 0.3 to 2 cubic feet per pound, contains 1 to 2 weight percent of polyvinyl alcohol which is at least 97 percent hydrolyzed and has a reference viscosity of at least 60 centipoises, and said rate corresponds to 50–150 pounds of said polyvinyl alcohol per acre of soil to be covered.

3. Process according to claim 2 wherein said foam contains, per weight part of said polyvinyl alcohol, 1 to 20 weight parts of asphalt softening at 110–220° F.

4. Process according to claim 1 wherein said foam is generated by disintegration of gas bubbles within a liquid aqueous mixture containing said polyvinyl alcohol and emulsified asphalt or wax, together with 1 to 300 weight parts of water-soluble anionic water-foaming agent per 100 weight parts of said polyvinyl alcohol.

5. Process according to claim 4 wherein said liquid mixture further comprises a dissolved gelling agent precursor containing at least one weight part of tetravalent titanium per thousand weight parts of said polyvinyl alcohol, and acid having a dissociation constant in water at least $10^{-7}$, the pH of said mixture being in the range of 2–5.

6. Process according to claim 5 wherein said precursor is potassium titanium oxalate providing 5–125 weight parts of titanium per 1000 weight parts of said polyvinyl alcohol, and at least one mole of oxalate per gram atom of titanium.

7. Process according to claim 6 wherein said foam is gelled by contact with ammonia.

8. Process according ot claim 4 wherein said liquid aqueous mixture additionally contains cationic emulsifier, and a non-ironic emulsifier in amount of 0.1 to 2 weight parts per weight part of said asphalt or wax, sufficient to maintain said asphalt or wax emulsified in said liquid mixture.

9. Process of claim 8 wherein said anionic water-foaming agent is sodium lauryl sulfate and said non-ionic emulsifier is isooctylphenoxypoly(ethoxy)ethanol.

10. Process according to claim 1 wherein said foam additionally contains a total of 0.1 to 10 weight parts, per wt. part of said polyvinyl alcohol, of dispersed filler including at least one member of the group consisting of fibrous potassium titanate and particulate carbon.

11. Process according to claim 10 wherein said foam includes carbon having a discrete particle size of less than 200 millimicrons and an ultimate particle size of 8 to 65 millimicrons.

12. Process according to claim 10 wherein said foam includes fibrous potassium titanate having an average fiber diameter of 0.2 to 0.3 micron, an average fiber length of 3–5 microns, and a weight ratio of $K_2O$ to $TiO_2$ in the range of 6–7.

13. Process according to claim 10 wherein said foam has a volume of 0.3 to 2 cubic feet per pound, contains 1 to 2 weight percent of polyvinyl alcohol which is at least 97 percent hydrolyzed and has a reference viscosity of at least 60 poises, and per weight part of said polyvinyl alcohol, 1 to 20 weight parts of asphalt softening at 110–220° F.

14. Process of claim 13 wherein foam is generated by disintegration of gas bubbles within a liquid aqueous mixture prepared from an aqueous solution of said polyvinyl alcohol containing 1 to 300 weight parts of water-soluble anionic water foaming agent per 100 parts of said polyvinyl alcohol and cationically emulsified asphalt together with 0.1 to 1 weight part non-ionic emulsifier per weight part of said asphalt.

15. Process of claim 14 wherein said liquid mixture further comprises 5 to 125 weight parts, per 1000 weight parts of said polyvinyl alcohol, of potassium titanium oxalate, and acid having a dissociation constant in water of at least $10^{-6}$, the pH of said mixture being in the range of 2–5.

16. Process of claim 15 wherein said foam is gelled by contact with gaseous ammonia in amount sufficient to raise the pH thereof to at least 8.0.

17. A dry, plant-penetrable, soil-contacting continuous film mulch comprising a uniform mixture of finely divided asphalt or wax softening below 220° F. and gelled polyvinyl alcohol, the amount of said polyvinyl alcohol corresponding to at least 15 pounds per acre of soil covered, said asphalt or wax being present in amount of at least 0.5 weight part per weight part of said polyvinyl alcohol.

18. A mulch according to claim 17 wherein the amount of said polyvinyl alcohol corresponds to 50–150 pounds per said acre, and comprises per weight part of said polyvinyl alcohol, 1 to 20 weight parts of asphalt softening at 110–220° F.

19. A mulch according to claim 17 including 1 to 10 weight parts, per weight part of said polyvinyl alcohol, of dispersed filler including at least one member from the group consisting of fibrous potassium titanate and particulate carbon.

20. A mulch according to claim 17 including tetravalent titanium crosslinking said polyvinyl alcohol in amount of at least 0.001 weight part per weight part of said polyvinyl alcohol.

21. A mulch according to claim 18 including, per weight part of said polyvinyl alcohol, at least 0.001 weight part of tetravalent titanium crosslinking said polyvinyl alcohol, and 0.5 to 2 weight parts of fibrous potassium titanate.

22. A dry blend intermediate for mulching comprising solid polyvinyl alcohol which is at least 97 percent hydrolyzed and has a reference viscosity of at least 60 centipoises, and, in parts by weight per 100 weight parts of said polyvinyl alcohol, 25–150 parts of water-soluble anionic water-foaming agent, 50–250 parts of fibrous potassium titanate, 5–50 parts of a stable water-soluble compound of tetravalent titanium, and solid acid sufficient to produce a pH below 6 when the blend is admixed with 15,000 weight parts of water per 100 weight parts of said polyvinyl alcohol.

23. A dry blend according to claim 22 wherein said anionic agent is sodium lauryl sulfate.

24. A dry blend according to claim 23 wherein titanium compound is potassium titanium oxalate.

25. A dry blend according to claim 24 including, per 100 weight parts of said polyvinyl alcohol, 50–250 parts of finely divided carbon.

26. A liquid mixture intermediate for mulching having a pH in the range of 2 to 5 and comprising an aqueous solution of 1 to 15 weight percent of dissolved polyvinyl alcohol which is at least 97 percent hydrolyzed and has a reference viscosity of at least 60 poises and, per 100 weight parts of said polyvinyl alcohol, 25–150 weight parts of dissolved anionic water-foaming agent, 5–50 weight parts of dissolved stable compound of tetravalent titanium, 50–250 weight parts of dispersed fibrous potassium titanate, and dissolved acid having a dissociation constant in water of at least $10^{-6}$.

27. A mixture according to claim 26 in which said dissolved tetravalent titanium compound is potassium titanium oxalate.

28. A mixture according to claim 27 in which said anionic agent is sodium lauryl sulfate.

29. A fluid mixture intermediate for mulching having a pH of 2–5 and comprising an aqueous solution of polyvinyl alcohol which is at least 97 percent hydrolyzed and has a reference viscosity of at least 60 centipoises, said polyvinyl alcohol constituting at least 0.5 weight percent of said mixture, and, per 100 weight parts of said polyvinyl alcohol, 25–150 weight parts of dissolved anionic water-foaming agent, 5–50 weight parts of dissolved stable compound of tetravalent titanium, 50–250 weight parts of dispersed fibrous potassium titanate, dissolved acid having a dissociation constant in water of at least $10^{-6}$, and at least 50 weight parts of emulsified asphalt or wax softening below 220° F.

30. A mixture according to claim 29 wherein said dissolved tetravalent titanium compound is potassium titanium oxalate.

31. A mixture according to claim 30 wherein anionic water-foaming agent is sodium lauryl sulfate.

32. A mixture according to claim 31 comprising 1 to 20 weight parts, per weight part of said polyvinyl alcohol, of emulsified asphalt softening at 110–220° F.

33. A mixture according to claim 32 comprising a cationic emulsifier for said asphalt and 0.1 to 1 weight part, per weight part of said asphalt, of a non-ionic emulsifier.

34. A mixture of claim 33 wherein said non-ionic emulsifier is octylphenoxypoly(ethoxy)ethanol.

35. The mixture of claim 29 in the foam of foam having a volume of at least 0.1 cubic foot per pound.

36. A foam according to claim 35 having a volume of 0.3 to 2 cubic feet per pound.

37. The process of applying a plant-penetrable soil-contacting continuous film mulch to soil which comprises dry blending solid polyvinyl alcohol, which is at least 80 percent hydrolyzed and has a reference viscosity of at least 30 centipoises, a solid material active in basic media to gel said polyvinyl alcohol, and a solid water-soluble anionic water-foaming agent, heating the resulting dry blend with water at a pH below 6 to dissolve said polyvinyl alcohol, combining the resulting product with an aqueous emulsion of asphalt or wax softening below 220° F. to obtain a foamable dispersion, in said polyvinyl alcohol solution, of at least 0.5 weight part of said asphalt or wax per weight part of said polyvinyl alcohol, and containing at least 0.5 weight percent of said volyvinyl alcohol, disintegrating bubbles of gas in said dispersion to obtain a foam having a volume of at least 0.1 cubic foot per pound, applying the resulting foam to soil as a continuous foam film and substantially simultaneously contacting said foam with ammonia whreby said polyvinyl alcohol is substantially simultaneously gelled, and allowing the wet gelled foam to dry to a continuous film mulch.

References Cited

UNITED STATES PATENTS

| | | | |
|---|---|---|---|
| 2,875,555 | 3/1959 | Thiegs et al. | 47—9 XR |
| 2,916,855 | 12/1959 | Thiegs | 47—58 |
| 2,945,322 | 7/1960 | Gaeth et al. | 47—9 |
| 3,024,570 | 3/1962 | Dow | 47—58 |
| 3,077,054 | 2/1963 | Niemeijer | 47—9 |

FOREIGN PATENTS 1,232,237  4/1960  France.

ROBERT E. BAGWILL, *Primary Examiner.*